United States Patent
Bond et al.

(10) Patent No.: US 10,604,231 B2
(45) Date of Patent: Mar. 31, 2020

(54) FAIRING DOOR ASSEMBLY AND METHODS OF OPERATING THE SAME

(71) Applicant: THE BOEING COMPANY, Chicago, IL (US)

(72) Inventors: Gary A. Bond, Kent, WA (US); Gary Cohen, Newcastle, WA (US)

(73) Assignee: The Boeing Company, Chicago, IL (US)

(*) Notice: Subject to any disclaimer, the term of this patent is extended or adjusted under 35 U.S.C. 154(b) by 395 days.

(21) Appl. No.: 15/717,018

(22) Filed: Sep. 27, 2017

(65) Prior Publication Data

US 2019/0092451 A1    Mar. 28, 2019

(51) Int. Cl.
*B64C 7/00* (2006.01)
*B64C 9/16* (2006.01)

(52) U.S. Cl.
CPC . *B64C 7/00* (2013.01); *B64C 9/16* (2013.01)

(58) Field of Classification Search
CPC ....... B64C 9/16; B64C 7/00; B64C 2009/143; B64C 9/18
See application file for complete search history.

(56) References Cited

U.S. PATENT DOCUMENTS

| | | |
|---|---|---|
| 4,131,252 A | 12/1978 | Dean et al. |
| 4,884,748 A | 12/1989 | Ward et al. |
| 6,189,833 B1 | 2/2001 | Ambrose et al. |
| 7,744,034 B2 | 6/2010 | Coughlin |
| 9,296,464 B1 | 3/2016 | Tuohimaa et al. |
| 9,623,957 B2 | 4/2017 | Bleazard et al. |

*Primary Examiner* — Valentina Xavier
(74) *Attorney, Agent, or Firm* — Armstrong Teasdale LLP

(57) ABSTRACT

A fairing door assembly for use with an aircraft includes a first door pivotable between a first door open position and a first door closed position. The first door open position is associated with a first flap position of a flap of the aircraft, and the first door closed position is associated with a second flap position of the flap. The fairing door assembly also includes a second door pivotally coupled to the first door. The second door is pivotable between a second door open position and a second door closed position. The second door open position is associated with the first flap position and the second door closed position is associated with a third flap position that is different than the first flap position.

20 Claims, 18 Drawing Sheets

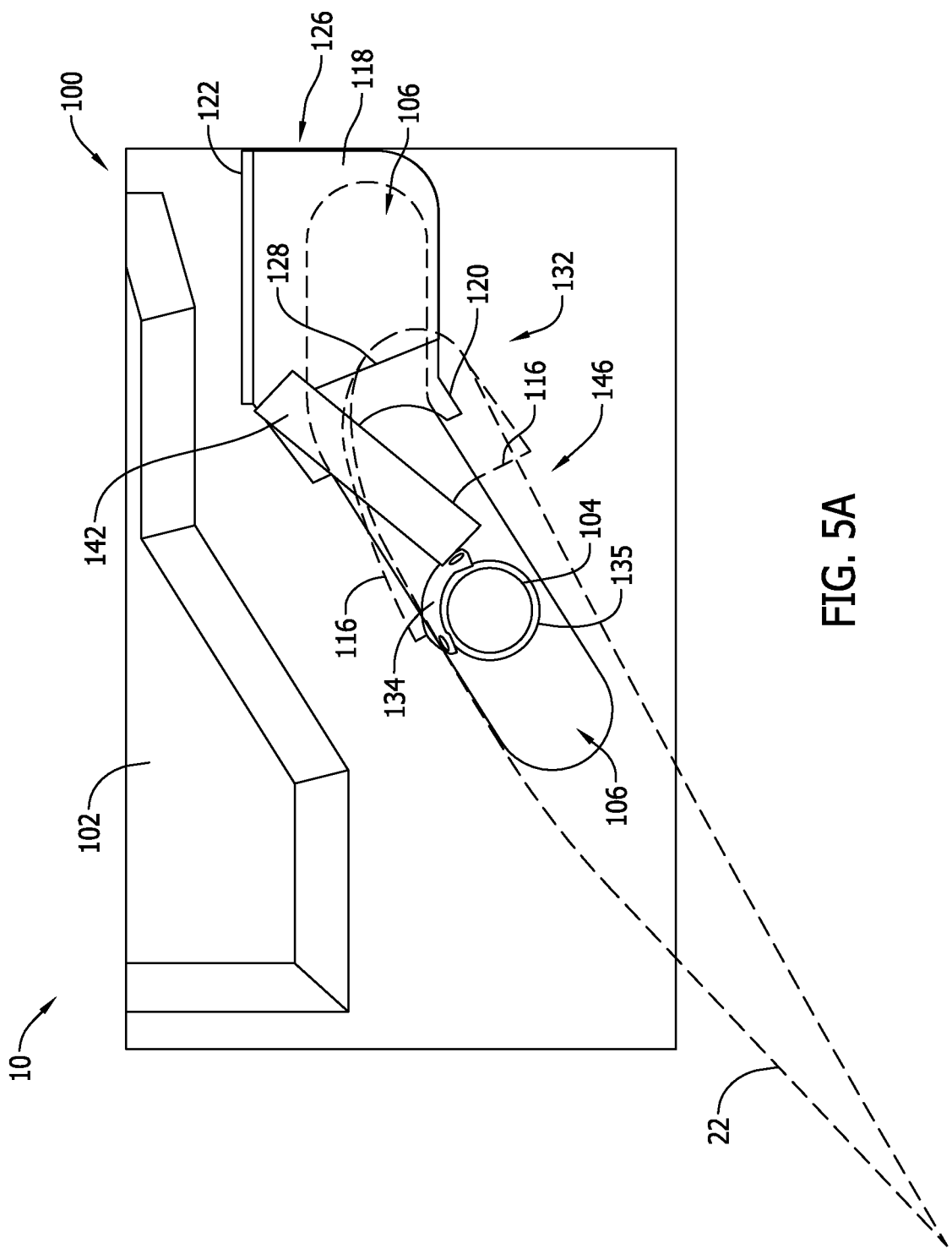

FAIRING DOOR ASSEMBLY AND METHODS OF OPERATING THE SAME

BACKGROUND

The field of the disclosure relates to commercial aircraft. More specifically, the disclosed embodiments relate to systems and methods for selectively covering a torque tube opening in a fuselage.

At least some known commercial aircraft include moveable flaps connected to each wing that controls an amount of lift the wing provides. A torque tube is used to move the flaps between a stowed position and a deployed position. Such torque tubes extend through a slot in a fairing of the fuselage. The torque tube travels along a path defined by the slot to move the flaps between the stowed position and the deployed position. When the slot is uncovered, external air coming through the landing gear cavity flows out of the slot and causes drag, which has an undesired effect of the performance of the aircraft.

In at least some known aircraft, a fairing door assembly rotates as the torque tube moves along the path to cover a portion of the slot after the torque tube has passed. However, known fairing door assemblies may not close until the torque tube is approaching its final deployed position. As such, the slot may still remain open for a significant duration and allow air to flow therein, having an undesired effect of the aircraft performance.

BRIEF DESCRIPTION

In one aspect, a fairing door assembly for use with an aircraft is provided. The fairing door assembly includes a first door pivotable between a first door open position and a first door closed position. The first door open position is associated with a first flap position of a flap of the aircraft, and the first door closed position is associated with a second flap position of the flap. The fairing door assembly also includes a second door pivotally coupled to the first door. The second door is pivotable between a second door open position and a second door closed position. The second door open position is associated with the first flap position and the second door closed position is associated with a third flap position that is different than the first flap position.

In yet another aspect, an aircraft is provided. The aircraft includes a structural panel defining a slot therethrough and a flap torque tube extending through the slot. The flap torque tube is moveable between at least a first flap position, a second flap position, and a third flap position. The aircraft also includes a fairing door assembly coupled to the structural panel and the flap torque tube. The fairing door assembly includes a first door pivotally coupled to the structural panel and pivotable between a first door open position and a first door closed position. The first door open position is associated with the first flap position and the first door closed position is associated with the second flap position. The fairing door assembly also includes a second door pivotally coupled to the first door and pivotable between a second door open position and a second door closed position. The second door open position is associated with the first flap position and the second door closed position is associated with the third flap position.

In still another aspect, a method of operating a flap assembly is provided. The method includes moving a flap torque tube along a slot in a structural panel between at least a first flap position, a second flap position, and a third flap position. The method also includes rotating a first door that is pivotally coupled to the structural panel between a first door open position and a first door closed position. The first door open position is associated with the first flap position and the first door closed position is associated with the second flap position. The method further includes rotating a second door that is pivotally coupled to the first door between a second door open position and a second door closed position. The second door open position is associated with the first flap position and the second door closed position is associated with the third flap position.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 5A is a side view of the flap torque tube in a third flap position, the first door of the fairing door assembly in the first door closed position, the second door of the fairing door assembly in a second door closed position.

DETAILED DESCRIPTION

The implementations described herein include a fairing door assembly for use with an aircraft is provided. The fairing door assembly includes a first door pivotable between a first door open position and a first door closed position. The first door open position is associated with a first flap position of a flap of the aircraft, and the first door closed position is associated with a second flap position of the flap. The fairing door assembly also includes a second door pivotally coupled to the first door. The second door is pivotable between a second door open position and a second door closed position. The second door open position is associated with the first flap position and the second door closed position is associated with a third flap position that is different than the first flap position.

The fairing door assembly described herein facilitates covering portions of a slot along which a flap torque tube, which supports the flaps, travels. More specifically, the dual doors of the described fairing door assembly are pivotally coupled to enable the doors to move with respect to one another. More specifically, pivoted connection enables the first door to close, and cover a portion of the slot, before the second door closes. Additionally, the first door closes at a point in time when the flap torque tube is traveling along the slot that is earlier than other known door assemblies. As such, the first door reduces the amount of undesired airflow through the slot through the sequence of flap deployment. Furthermore, the second door closes, and covers a portion of the slot, prior to the flap torque tube reaching its fully deployed position. As such, the second door covers the slot earlier in the deployment sequence than other known door assemblies and, therefore, further reduces the amount of airflow through the slot. As described herein, reducing or preventing airflow through the slot during deployment of the flaps facilitates decreasing the drag and increasing the efficiency of the aircraft.

Figure 1:
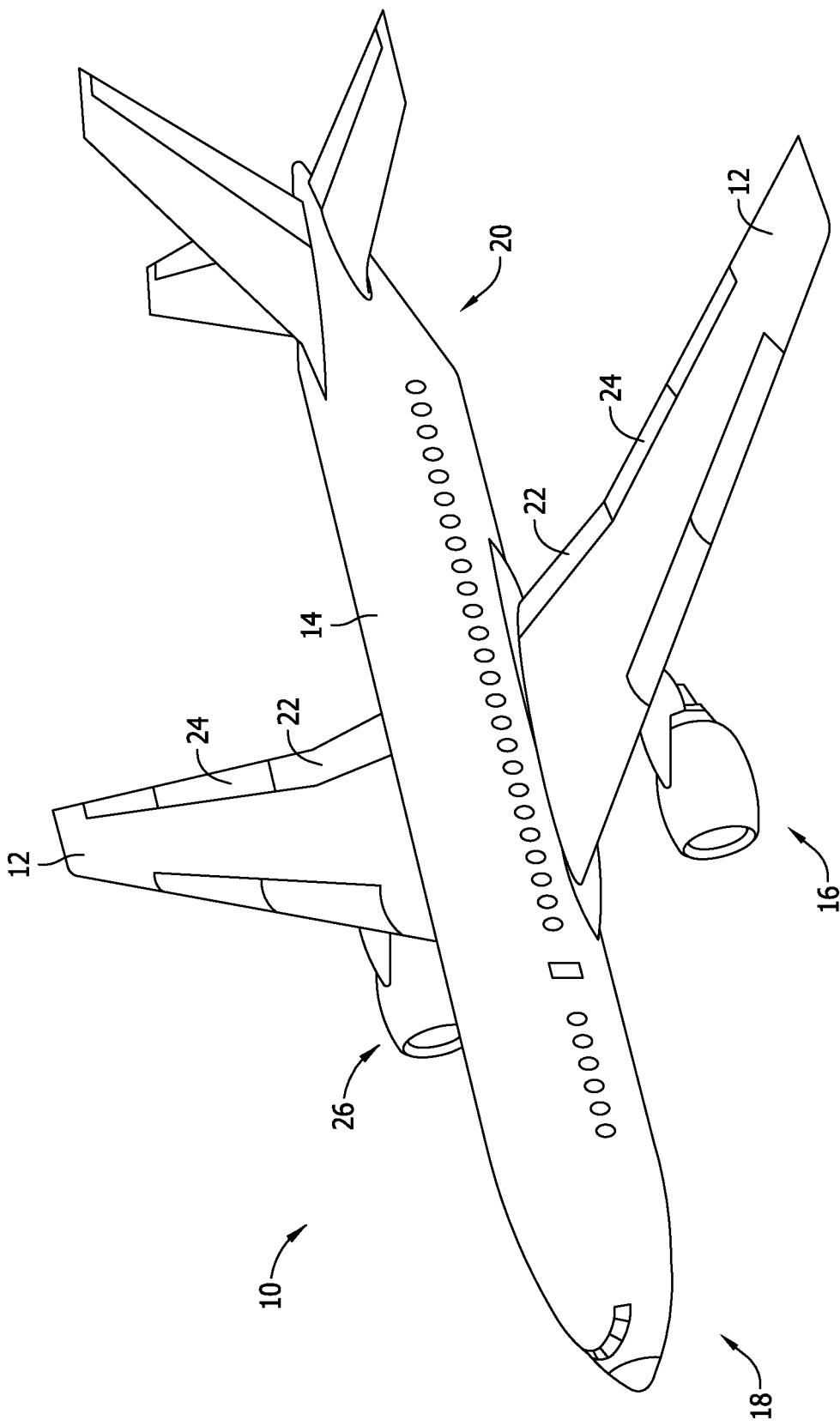
FIG. 1 is a perspective view of an aircraft.

FIG. 1 is a perspective view of an illustrative commercial jet aircraft 10 having wings 12, a fuselage 14, and a propulsion system 16. Fuselage 14 includes a nose portion 18 at the forward end of the fuselage, and a tail portion 20 at the aft end of the fuselage.

Wings 12 include any suitable airfoil structures configured to provide lift to the aircraft. Wings 12 are shown in FIG. 1 as elongate structures extending from a lower portion of fuselage 14 in a swept wing, tapered planform. In other examples, wings 12 are straight or delta-shaped. In other examples, wings 12 are trapezoidal, constant, elliptical, semi-elliptical, or other configurations known in the art. Wings 12 also include control surfaces, such as flaps. More specifically, wings 12 each include an inboard flap 22 and an outboard flap 24. Flaps 22 and 24 are configured to alter the lift characteristics of wing 12 and are pivotable along a curved or segmented path.

Figure 2A:
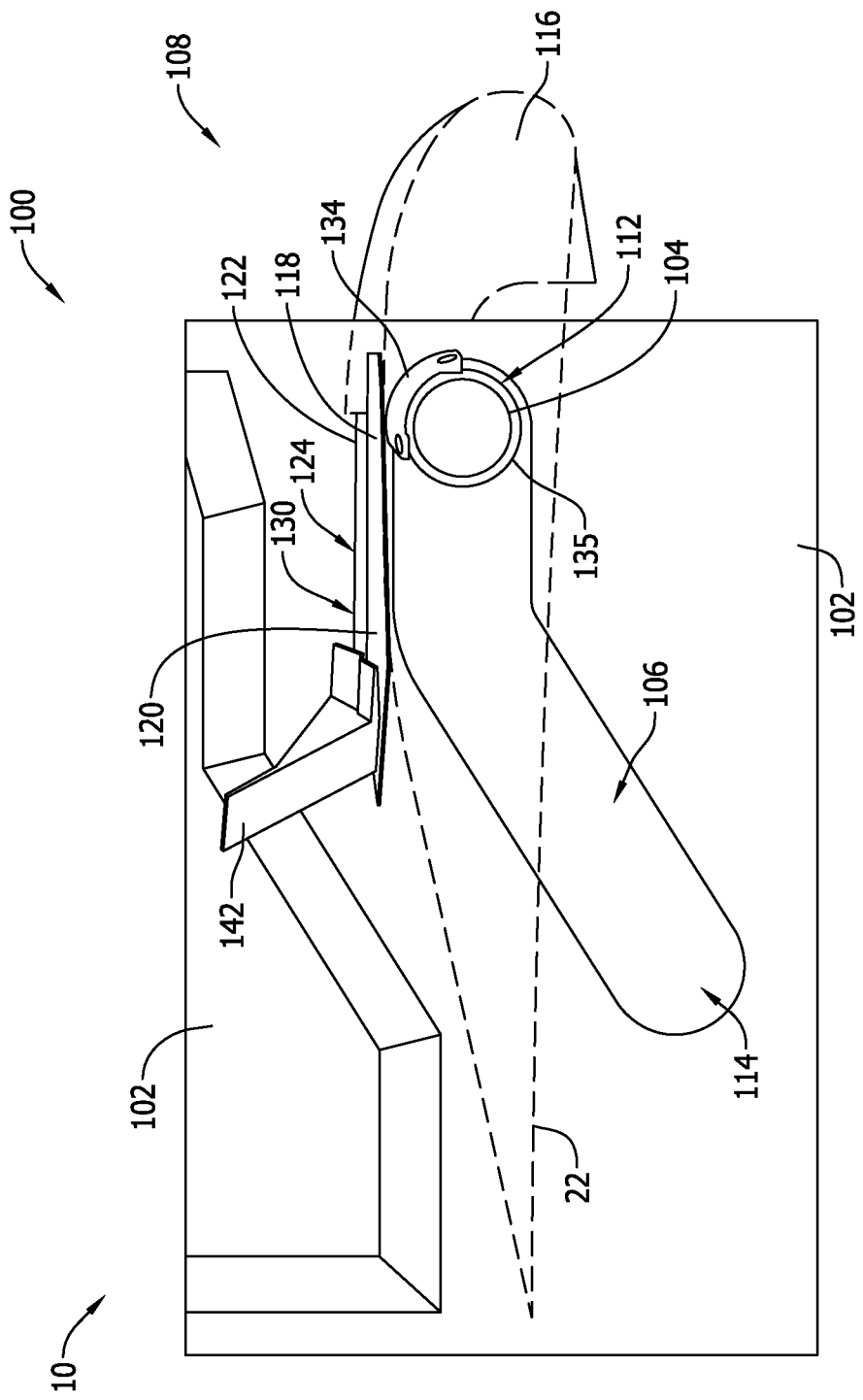
FIG. 2A is a side view of a flap torque tube and a fairing door assembly in a stowed position.
Figure 2B:
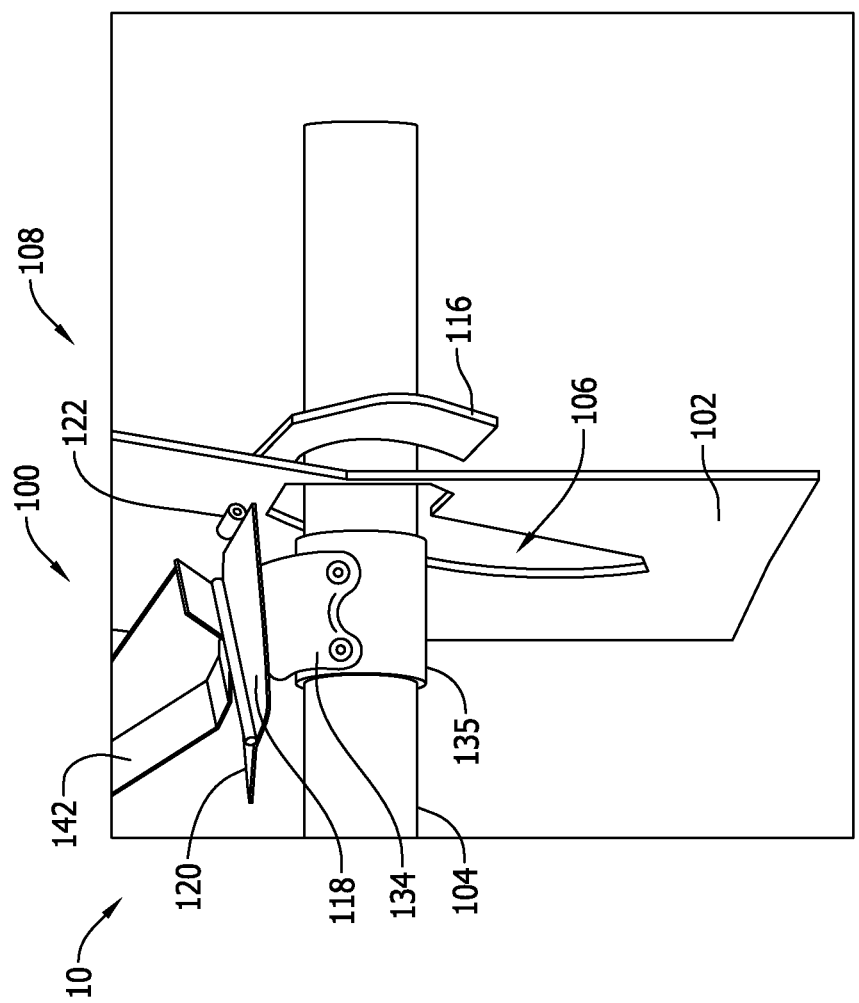
FIG. 2B is a perspective view of the flap torque tube and the fairing door assembly in the stowed position.
Figure 2C:
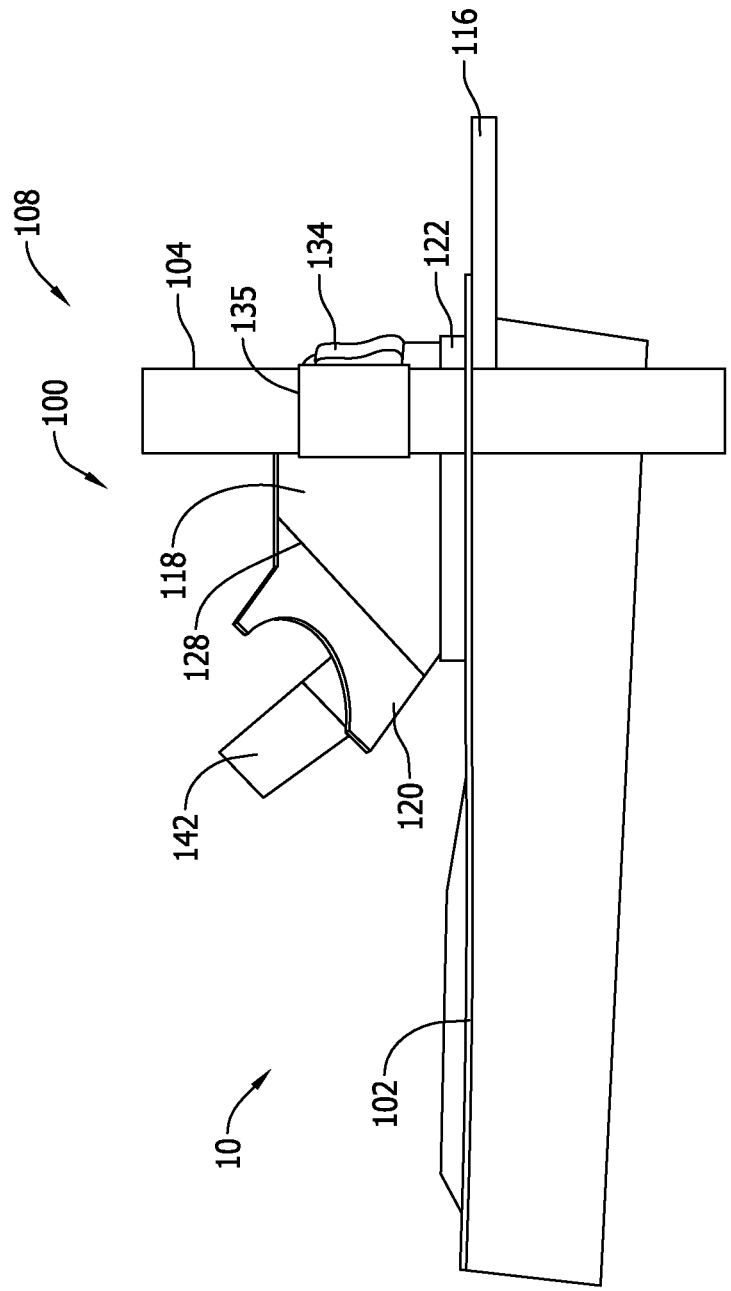
FIG. 2C is a bottom view of the flap torque tube and a fairing door assembly in the stowed position.
Figure 5B:
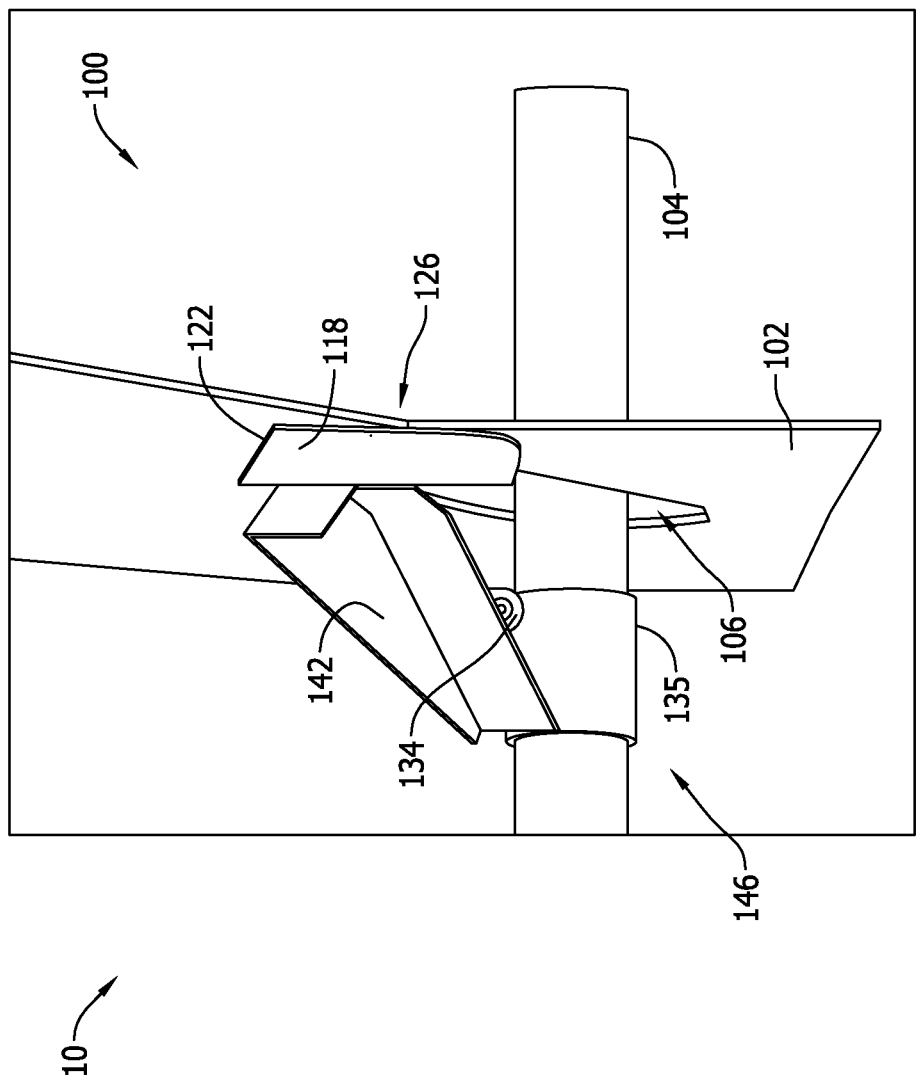
FIG. 5B is a perspective view of the flap torque tube in the third flap position, the first door of the fairing door assembly in the first door closed position, the second door of the fairing door assembly in the second door closed position.
Figure 5C:
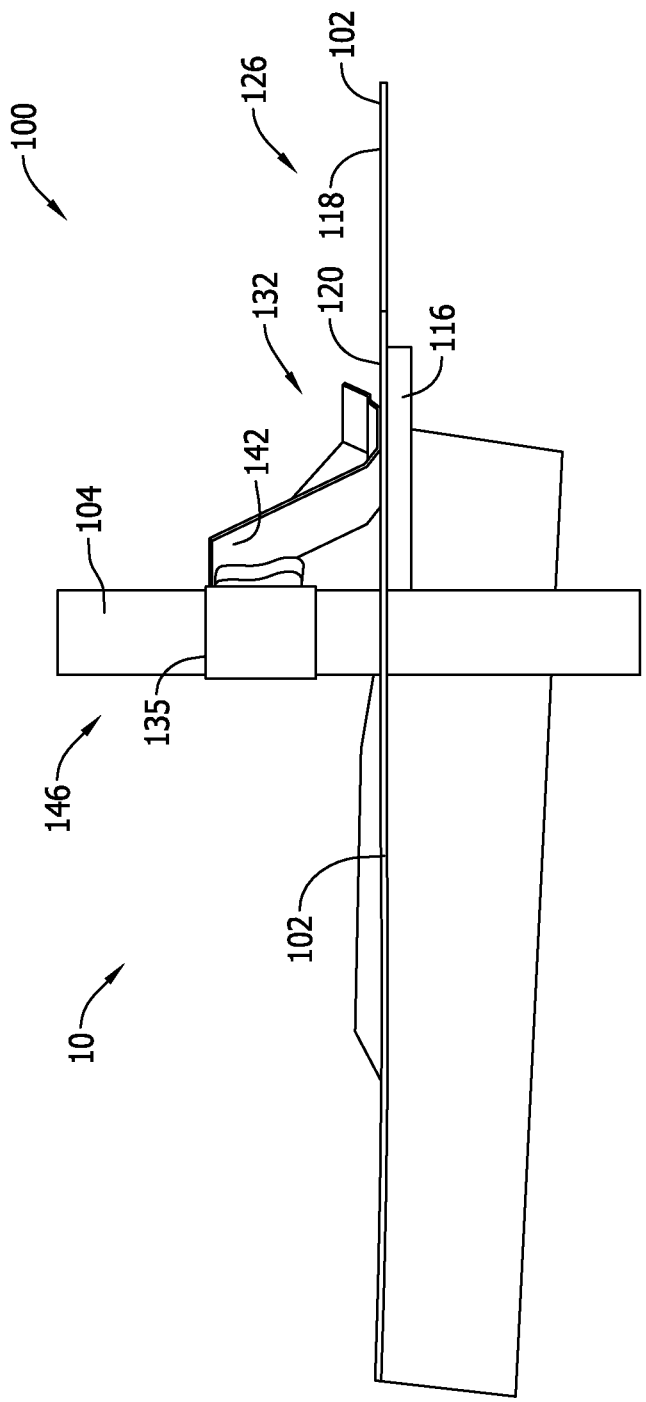
FIG. 5C is a bottom view of the flap torque tube in the third flap position, the first door of the fairing door assembly in the first door closed position, the second door of the fairing door assembly in the second door closed position.
Figure 6A:
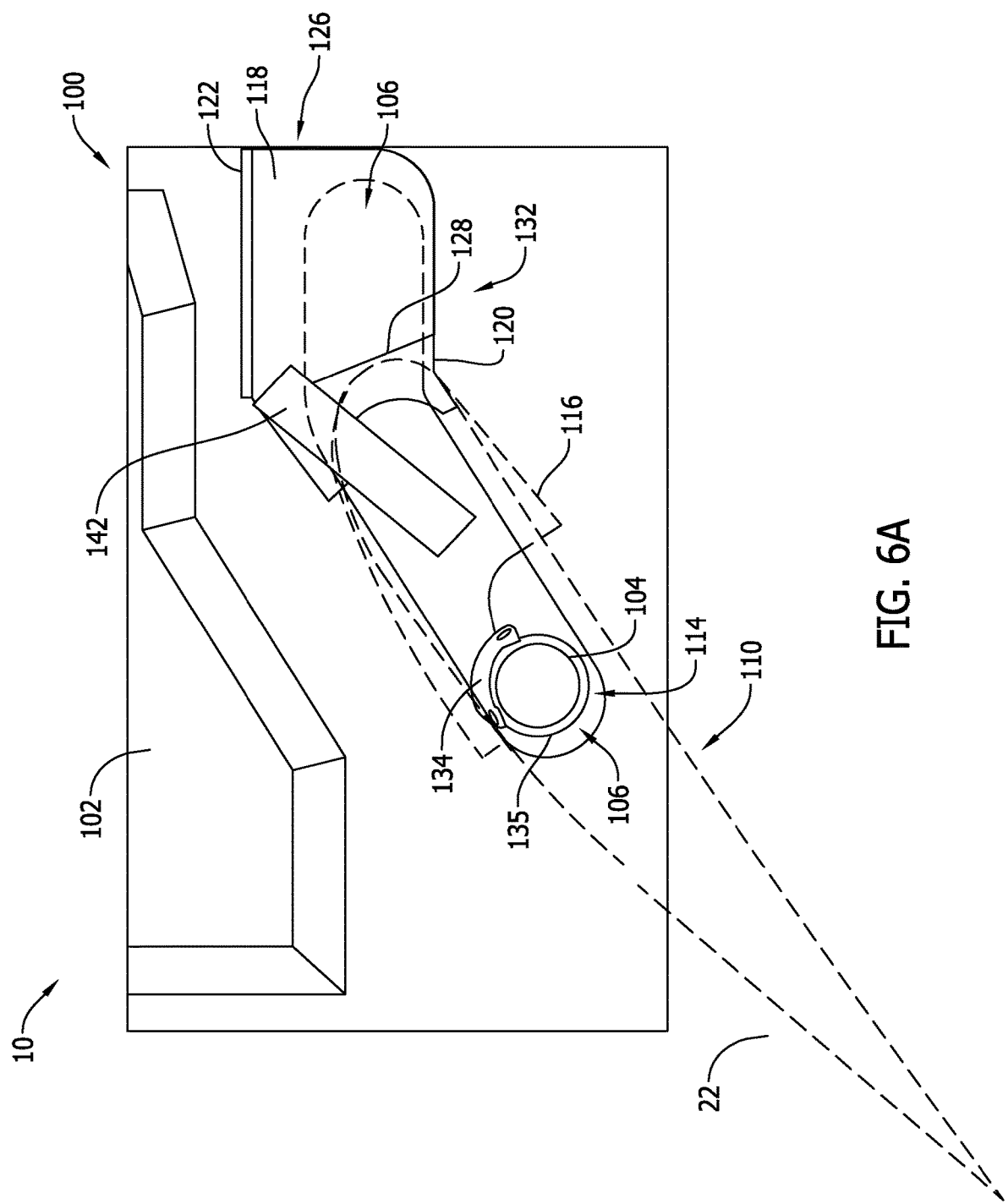
FIG. 6A is a side view of the flap torque tube in a deployed position, the first door of the fairing door assembly in the first door closed position, the second door of the fairing door assembly in the second door closed position.
Figure 6B:
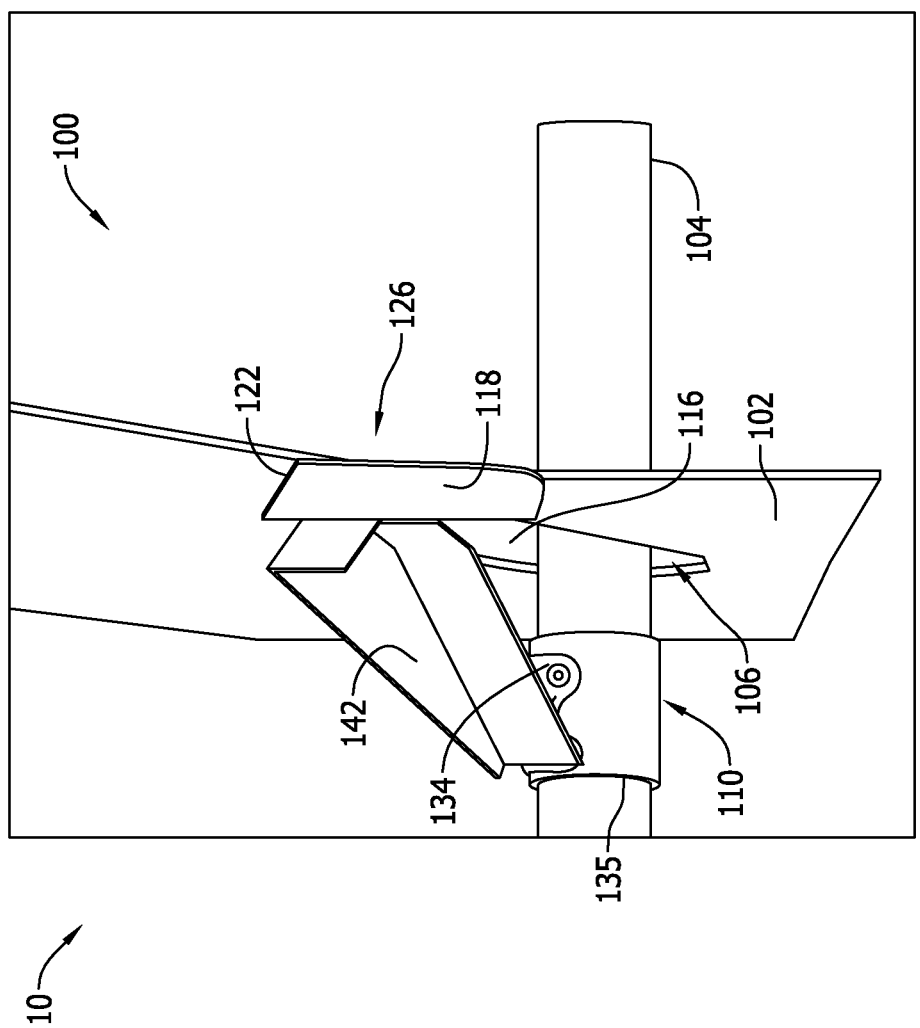
FIG. 6B is a perspective view of the flap torque tube in the deployed position, the first door of the fairing door assembly in the first door closed position, the second door of the fairing door assembly in the second door closed position.
Figure 6C:
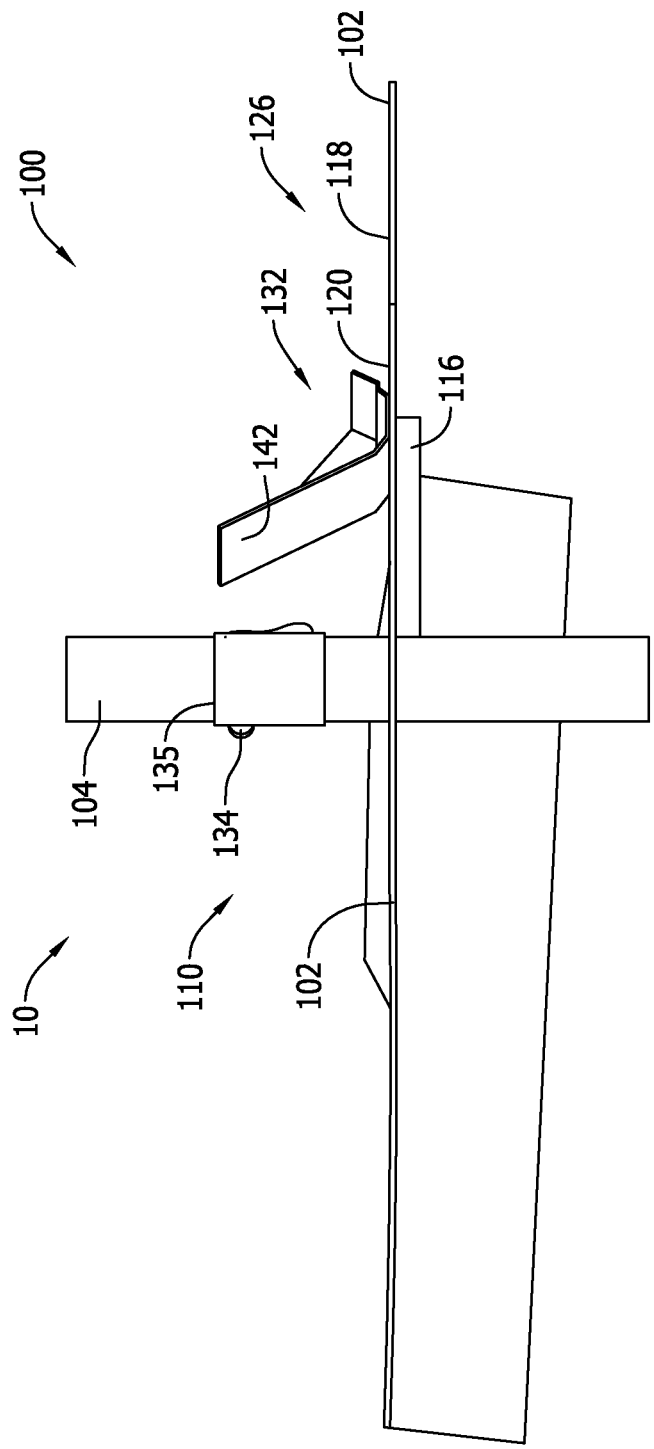
FIG. 6C is a bottom view of the flap torque tube in the deployed position, the first door of the fairing door assembly in the first door closed position, the second door of the fairing door assembly in the second door closed position.

As described herein, flaps 22 are configured to pivot and translate through a predetermined path as the flap 22 moves between a stowed or "flaps up" position (as shown in FIGS. 2A-2C) to a deployed or "flaps down" position (as shown in FIGS. 6A-6C). Furthermore, in the exemplary implementation, flap 22 is actuated or moved between positions by way of a torque member (also referred to as a torque tube) that extends into fuselage 14 from each wing 12. Accordingly, a torque tube opening (shown in FIGS. 2A-6C) is formed in a structural panel (shown in FIGS. 2A-6C) of a fairing between fuselage 14 and wing 12 to accommodate the motion of the torque tube.

FIG. 2A is a side view of a fairing door assembly 100 coupled to aircraft 10 in a stowed position. FIG. 2B is a perspective view of the flap torque tube and the fairing door assembly in the stowed position. FIG. 2C is a bottom view of the flap torque tube and a fairing door assembly in the stowed position. In the exemplary implementation, aircraft 10 includes a fairing structural panel 102 coupled to fairing door assembly 100. Aircraft 10 also includes a flap torque tube 104 that extends through a slot 106 in fairing structural panel 102. As described herein, flap torque tube 104 is moved along slot 106 between the illustrated stowed position 108 and a deployed position 110 (shown in FIGS. 6A-6C). Slot 106 includes a first or forward end 112 that receives flap torque tube 104 in the stowed position 108 and a second or aft end 114 that receives flap torque tube 104 in the deployed position 110. In the exemplary implementation, slot 106 allows a full range of motion for flap torque tube 104 and associated flap 22 during operations. Slot 106 may be referred to interchangeably as an aperture, a hole, an opening, and/or a window. As described herein, aircraft 10 also includes a forward seal 116 that is coupled to and moves with flap torque tube 104 such that forward seal at least partially covers portions of slot 106 as flap torque tube 104 moves between stowed position 108 and deployed position 110.

In the exemplary implementation, fairing door assembly 100 includes a first door 118 and a second door 120 pivotally coupled to first door 118. More specifically, first door 118 is pivotally coupled to fairing structural panel 102 by a hinge 122 that biases first door 118 downward toward a first door closed position 126 (shown in FIGS. 4A-6C) from a first door open position 124, as is shown in FIGS. 2A-3C. In the first door open position 124, first door 118 is substantially perpendicular to fairing structural panel 102 and flap torque tube 104 is positioned proximate first end 112 of slot 106. More specifically, first door 118 is in the first door open position 124 when flap 22 and flap torque tube 104 are in the stowed position 108.

Second door 120 is pivotally coupled to first door 118 at a hinge line 128 that enables second door 120 to move and rotate independent of first door 118. Similar to first door 118, second door 120 is pivotable between a second door open position 130, as is shown in FIGS. 2A-3C, and a second door closed position 132 (shown in FIGS. 5A-6C). In the second door open position 130, second door 120 is substantially perpendicular to fairing structural panel 102 and parallel to first door 118. More specifically, similar to first door 118, when flap 22 and flap torque tube 104 are in the stowed position 108 second door 120 is in the second door open position 130.

Fairing door assembly 100 also includes a contact member 134 coupled to flap torque tube 104. In the exemplary implementation, contact member 134 is coupled to flap torque tube 104 via a collar 135 extending circumferentially about flap torque tube 104. In other implementations, contact member 134 is coupled to flap torque tube 104 in any manner that facilitates operation of fairing door assembly 100 as described herein.

Contact member 134 moves with flap torque tube 104 between the stowed position 108 and the deployed position 110 and is configured to separately contact first door 118 and second door 120 to facilitate proper timing sequence of doors 118 and 120. Contact member 134 contacts first door 118 to transition first door 118 between the first door open position 124 and the first door closed position 126. Similarly, contact member 134 contacts second door 120 to transition second door 120 between the second door open position 130 and the second door closed position 132. In operation in the stowed position 108, both first door 118 and second door 120 are in their respective door open positions 124 and 130 and hinge 122 biases first door 118 downward toward flap torque tube 104 such that first door 118 engages contact member 134.

Figure 3A:
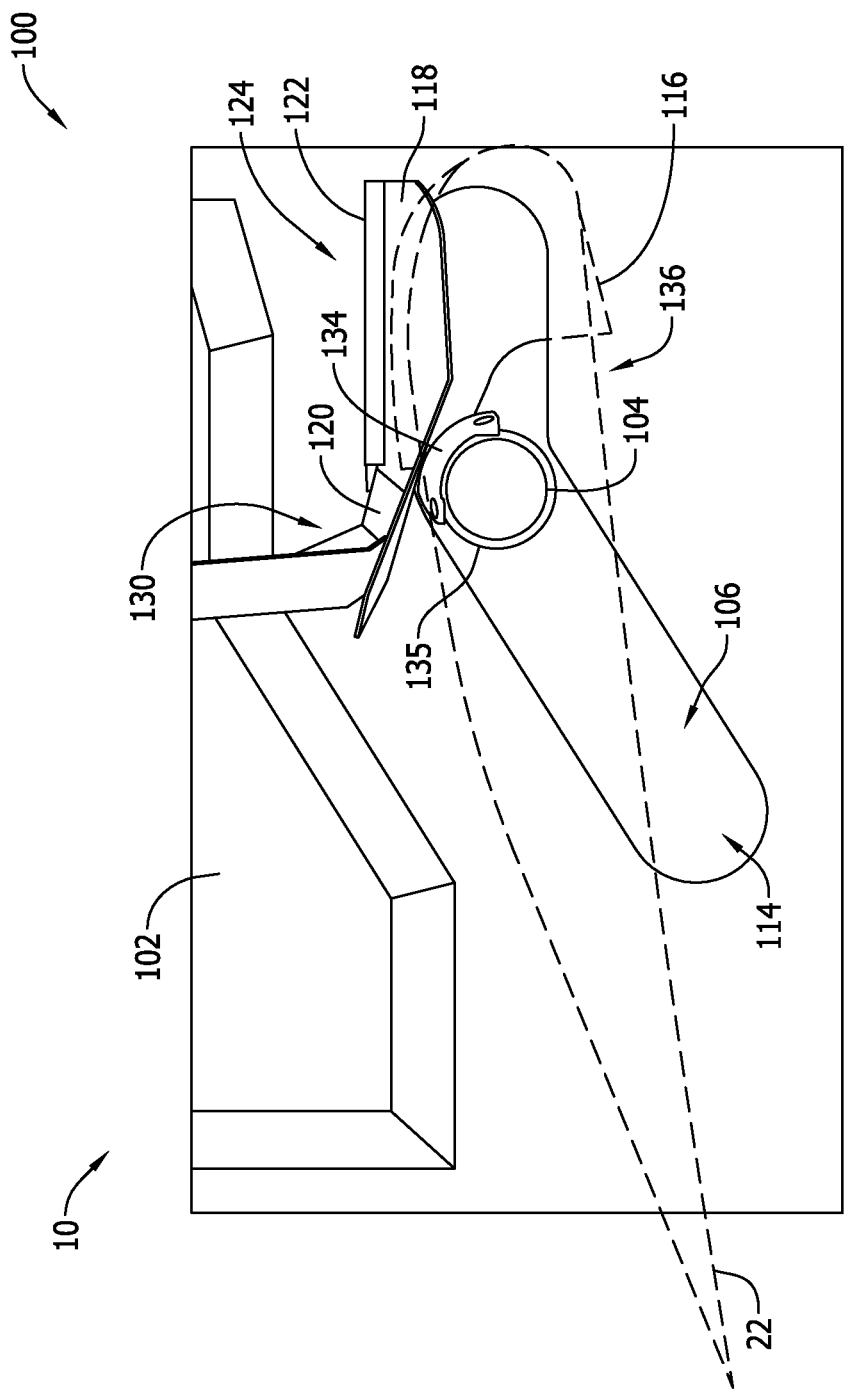
FIG. 3A is a side view of the flap torque tube in a first flap position, a first door of the fairing door assembly in a first door open position, a second door of the fairing door assembly in a second door open position.
Figure 3B:
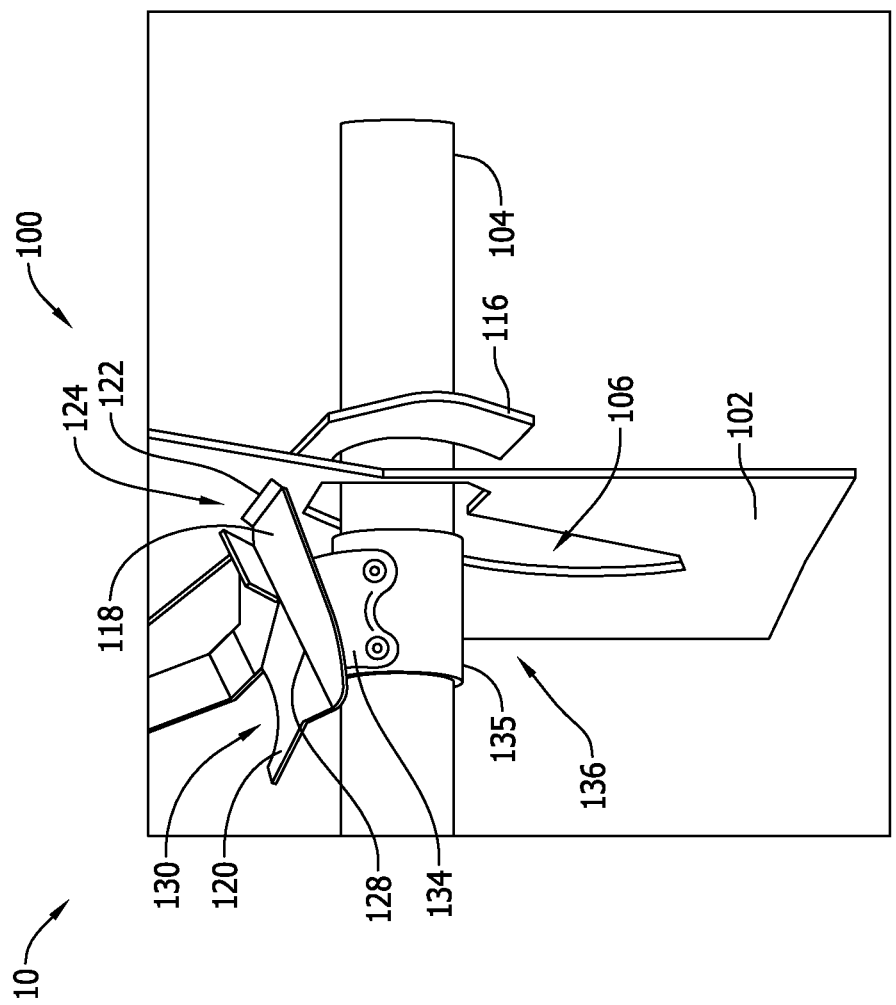
FIG. 3B is a perspective view of the flap torque tube in the first flap position, the first door of the fairing door assembly in the first door open position, the second door of the fairing door assembly in the second door open position.
Figure 3C:
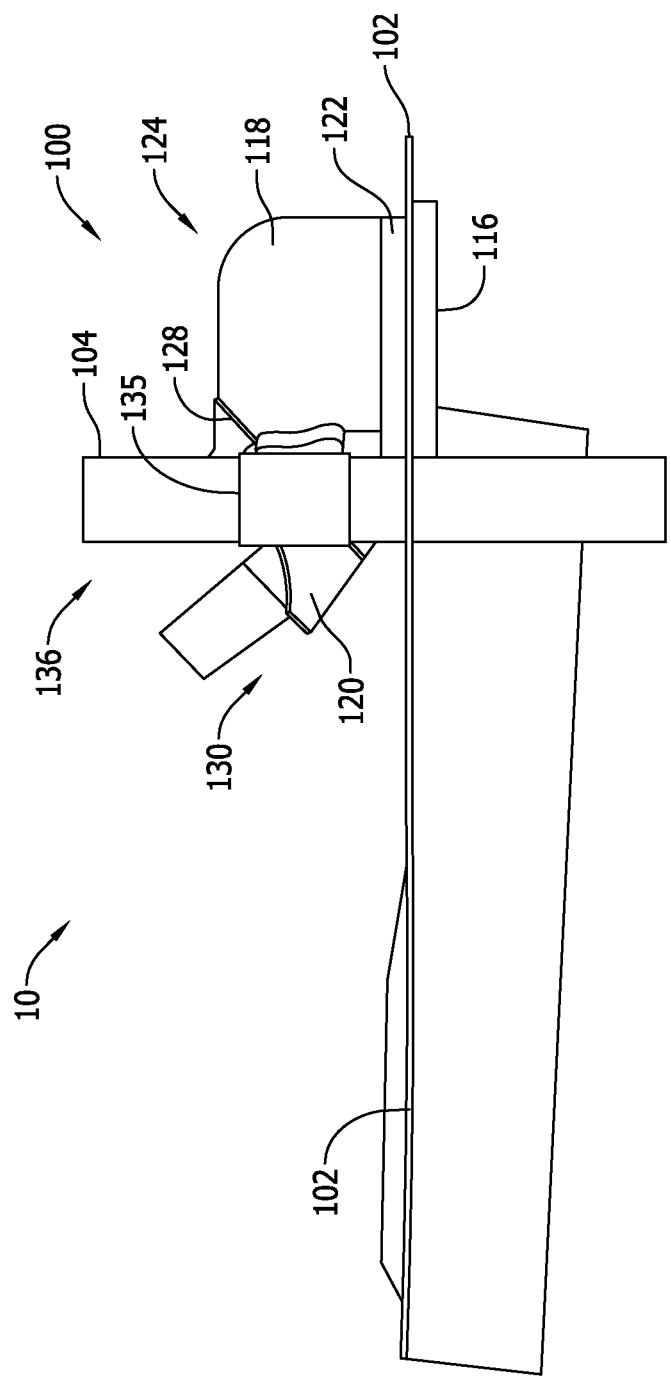
FIG. 3C is a bottom view of the flap torque tube in the first flap position, the first door of the fairing door assembly in the first door open position, the second door of the fairing door assembly in the second door open position.

FIG. 3A is a side view of flap torque tube 104 in a first flap position 136, FIG. 3B is a perspective view of flap torque tube 104 in the first flap position 136, and FIG. 3C is a bottom view of flap torque tube 104 in the first flap position 136. In the first flap position 136, flap 22 and flap torque tube 104 have moved aftward within slot 106 away from slot first end 112. As such, contact member 134 also moves aftward and at least partially engages second door 120 such that second door 120 pivots about hinge 128 with respect to first door 118 when flap torque tube 104 is in the first flap position 136. Additionally, hinge 122 biases first door 118 downward such that first door 118 pivots slightly about hinge 122.

When flap torque tube 104 is in the first flap position 136, first door 118 is still considered to be in the first door open position 124 because first door 118 does not yet cover any portion of slot 106 when flap torque tube 104 is in the first flap positon 136. Similarly, when flap torque tube 104 is in the first flap position 136, second door 120 is still considered to be in the second door open position 130 because second door 120 does not yet cover any portion of slot 106 when flap torque tube 104 is in the first flap positon 136.

Figure 4A:
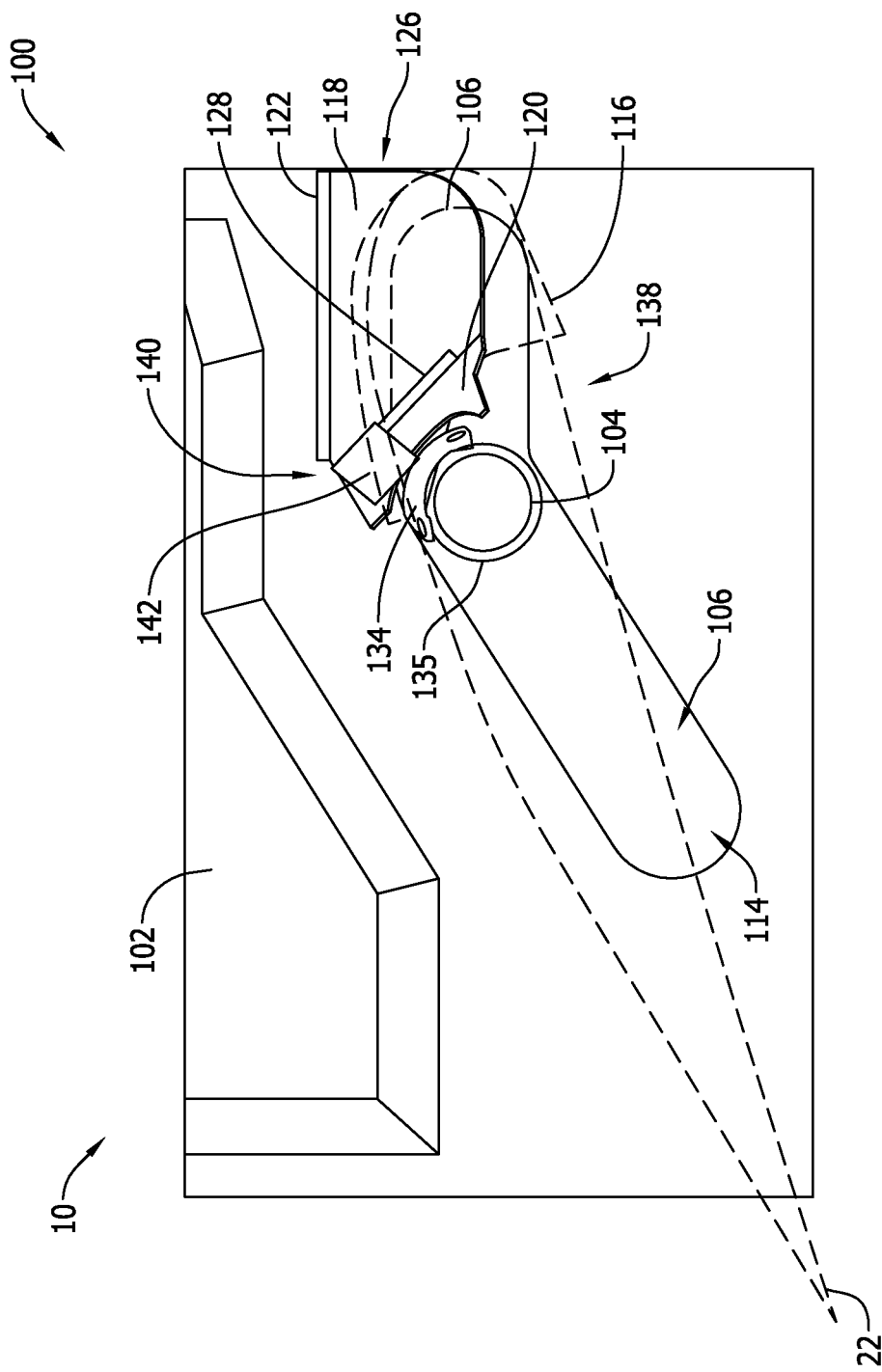
FIG. 4A is a side view of the flap torque tube in a second flap position, the first door of the fairing door assembly in a first door closed position, the second door of the fairing door assembly in the second door open position.
Figure 4B:
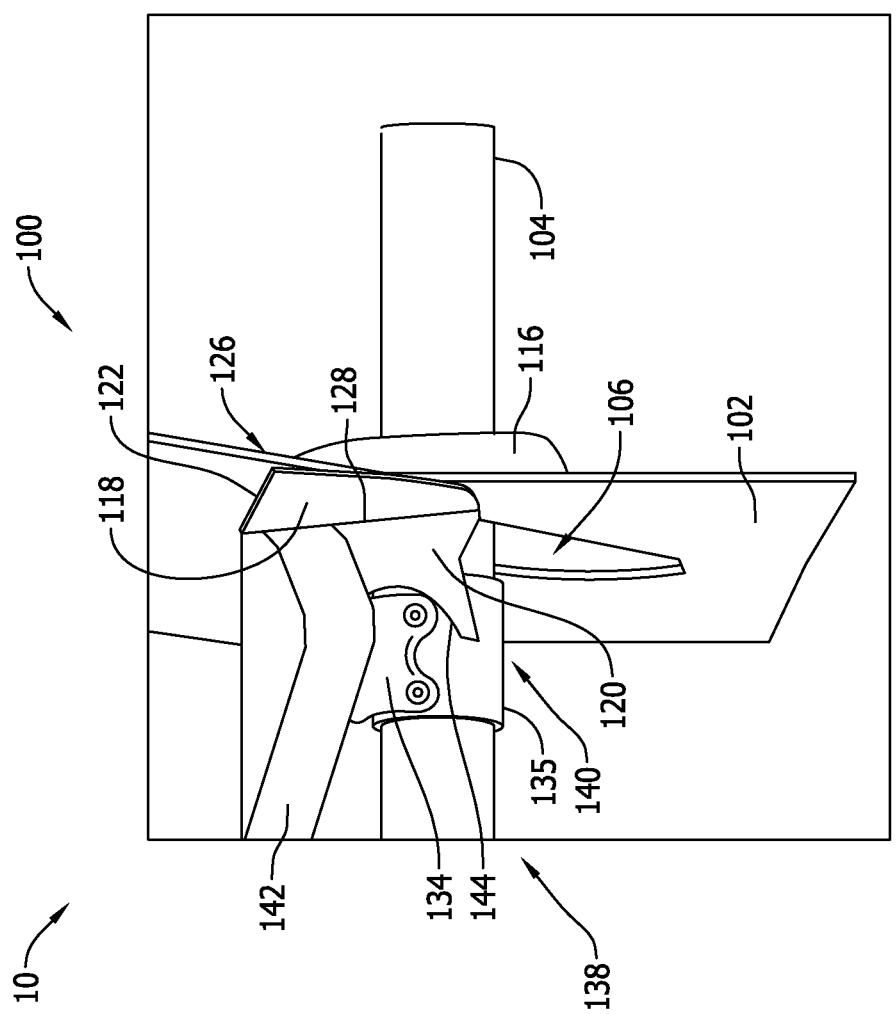
FIG. 4B is a perspective view of the flap torque tube in the second flap position, the first door of the fairing door assembly in the first door closed position, the second door of the fairing door assembly in the second door open position.
Figure 4C:
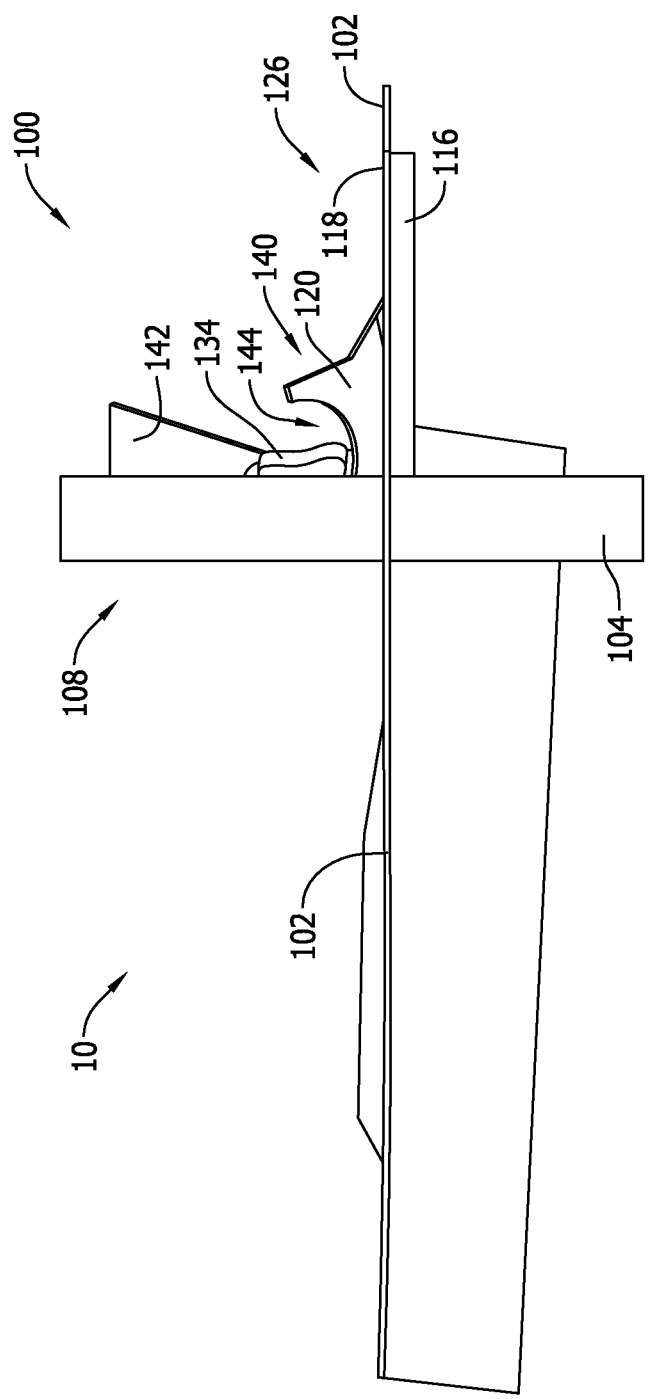
FIG. 4C is a bottom view of the flap torque tube in the second flap position, the first door of the fairing door assembly in the first door closed position, the second door of the fairing door assembly in the second door open position.

FIG. 4A is a side view of flap torque tube 104 in a second flap position 138, FIG. 4B is a perspective view of flap torque tube 104 in the second flap position 138, and FIG. 4C is a bottom view of flap torque tube 104 in the second flap position 138. In the exemplary implementation, when flap torque tube 104 is in the second flap position 138, first door 118 is in the first door closed position 126 and second door 120 is in a second door intermediate position 140, where second door 120 is still at least partially open.

As shown in FIGS. 4A-4C, in the second flap position 138, flap torque tube 104 and flap 22 have moved further aftward within slot 106 than in first flap position 136. In the first door closed position 126, hinge 122 biases first door 118 downwards such that first door 118 is oriented substantially parallel with fairing structural panel 102 and partially covers slot 106 to reduce an amount of air flowing through slot 106. As described herein, hinge 122 is biased to keep first door 118 in the first door closed position 126 until flap torque tube 104 moves from the second flap position 138 back to the first flap position 136.

In the exemplary implementation, second door 120 includes a transition member 142 fixedly coupled thereto such that transition member 142 extends from second door 120. More specifically, transition member 142 extends from second door 120 at an oblique angle. As best shown in FIG. 4B, second door 120 includes a notch 144 that at least partially receives contact member 134 to enable contact member 134 to engage transition member 142. As such, contact member 134 does not contact second door 120, only transition member 142, when second door 120 is in the second door intermediate position 140. Alternatively, in other embodiments, contact member 134 may engage both second door 120 and transition member 142 when second door 120 is in the second door intermediate position 140.

In operation, a force on transition member 142 causes second door 120 to pivot along hinge 128 with respect to first door 118. More specifically, in the second flap position 138, contact member 134 engages transition member 142 and applies a force to transition member 142 to cause second door 120 to further pivot about hinge 128 with respect to first door 118.

FIG. 5A is a side view of flap torque tube 104 in a third flap position 146, FIG. 5B is a perspective view of flap torque tube 104 in the third flap position 146, and FIG. 5C is a bottom view of flap torque tube 104 in the third flap position 146. In the exemplary implementation, when flap torque tube 104 is in the third flap position 146, first door 118 remains in the first door closed position 126 and second door 120 transitions to the second door closed position 132. Similar to the first door closed position 126, when second door 120 is in the second door closed position 132, second door 120 is oriented substantially parallel to fairing structural panel 102 and covers a portion of slot 106 to reduce airflow through slot 106. As such, both first door 118 and second door 120 are in their respective closed positions 126 and 132 when flap torque tube 104 is in the third flap position 146.

In the exemplary implementation, the third flap position 146 is associated with a position along slot 106 that is forward of the deploy position 110 (shown in FIGS. 6A-6C). As such, both doors 118 and 120 are closed, to block airflow through slot 106, before flap 22 and flap torque tube 104 reach the deployed position 110. More specifically, first door 118 blocks a portion of slot 106 proximate first end 112 of slot 106, and second door 120 blocks a portion of slot 106 aft of the portion blocked by first door 118. Accordingly fairing door assembly 100 facilitates reducing an amount of air flowing through slot 106 compared to known door assemblies, which decreases the drag on aircraft 10 and improves the efficiency of aircraft 10.

In transitioning back to the second flap position 138 from the third flap position 146, a force on transition member 142 causes second door 120 to pivot along hinge 128 with respect to first door 118 such that continued force on transition member 142 causes second door 120 to transition from the second door closed position 132, to the second door intermediate position 140, and to the second door open position 130. More specifically, as flap torque tube 104 moves from the third flap position 146 to the second flap position 138, contact member 134 engages transition member 142 to cause transition member 142 to pivot second door 120 from the second door closed position 132, to the second door intermediate position 140, and to the second door open position 130.

Furthermore, in transitioning back to the first flap position 136 from the second flap position 138, contact member 134 moves forward with flap torque tube 104 and moves from transition member 142 to second door 120 such that second door moves from second door intermediate position 140 to second door open position 130. As such, contact member 134 contacts first door 118 when flap torque tube 104 is in the first flap position 136 and contacts the transition member 142 when flap torque tube 104 is in the second flap position 138 and the third flap position 146.

As described herein, flap torque tube 104 is moveable between a first flap position 136, a second flap position 138, and a third flap position 146. Additionally, fairing door assembly 100 includes first door 118 pivotally coupled to fairing structural panel 102 and pivotable between first door open position 124 and first door closed position 126. The first door open position 124 is associated with the first flap position 136 and the first door closed position 126 is associated with the second flap position 138. Fairing door assembly 100 also includes second door 120 pivotally coupled to first door 118 and is pivotable between second door open position 130 and second door closed position 132. The second door open position 130 is associated with the first flap position 136 and the second door closed position 132 is associated with the third flap position 146, which is different from the first flap position 136 and the second flap position 138.

FIG. 6A is a side view of flap torque tube 104 in the deployed position 110, FIG. 6B is a perspective view of flap torque tube 104 in the deployed position 110, and FIG. 6C is a bottom view of flap torque tube 104 in the deployed position 110. In the exemplary implementation, when flap torque tube 104 is in the deployed position 110, first door 118 remains in the first door closed position 126 and second door 120 also remains in the second door closed position 132. In the deployed position, flaps 22 are fully deployed and flap torque tube 104 is positioned within slot 106 proximate second end 114 of slot 106. As best shown in FIG. 6A, first door 118 blocks a portion of slot 106 proximate first end 112 of slot 106, second door 120 blocks a portion of slot 106 aft of the portion blocked by first door 118, and forward seal 116 blocks a portion of slot 106 aft of the portion blocked by second door 120. As such, a majority of slot 106 is blocked to reduce airflow through slot 106.

Figure 7:
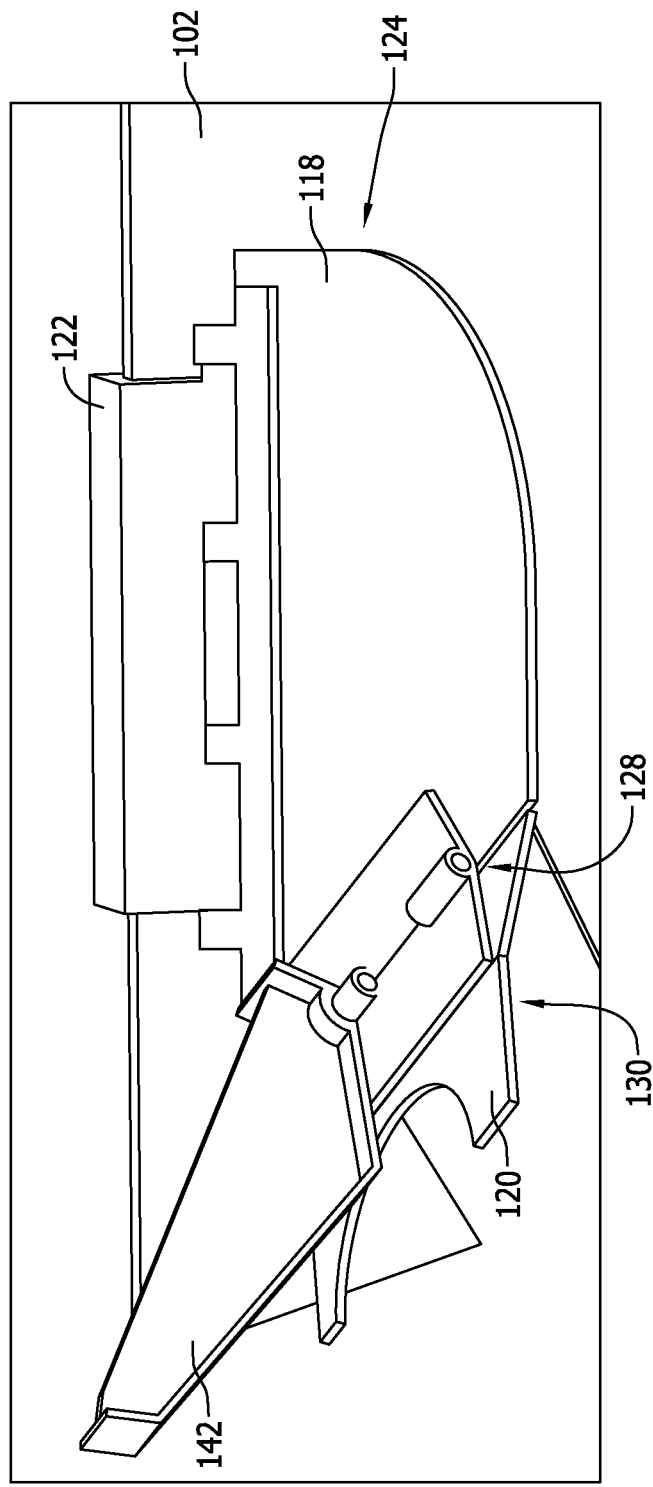
FIG. 7 is a perspective view of the first door in the first door open position and the second door in the second door open position.

FIG. 7 is a perspective view of first door 118 in the first door open position 124 and second door 120 in the second door open position 130. In the exemplary implementation, first door 118 is pivotally coupled to fairing structural panel 102 by hinge 122 that biases first door 118 downward toward the first door closed position 126 (shown in FIGS. 4A-6C) from the first door open position 124. In the first door open position 124, first door 118 is substantially perpendicular to fairing structural panel 102. In another implementation, first door 118 is obliquely oriented to fairing structural panel 102 in the first door open position 124. Generally, first door 118 is positioned at any orientation with respect to fairing structural panel 102 in the first door open position 124 such that first door 118 does not cover slot 106.

Second door 120 is pivotally coupled to first door 118 at a hinge line 128 that enables second door 120 to move and rotate independent of first door 118. Similar to first door 118, second door 120 is pivotable between the second door open position 130, and the second door closed position 132 (shown in FIGS. 5A-6C). In the second door open position 130, second door 120 is substantially perpendicular to fairing structural panel 102 and parallel to first door 118. In another implementation, second door 120 is obliquely oriented to first door 118 in the second door open position 130. Generally, second door 120 is positioned at any orientation with respect to first door 118 in the second door open position 130 such that neither first door 118 nor second door 120 cover slot 106.

Figure 8:
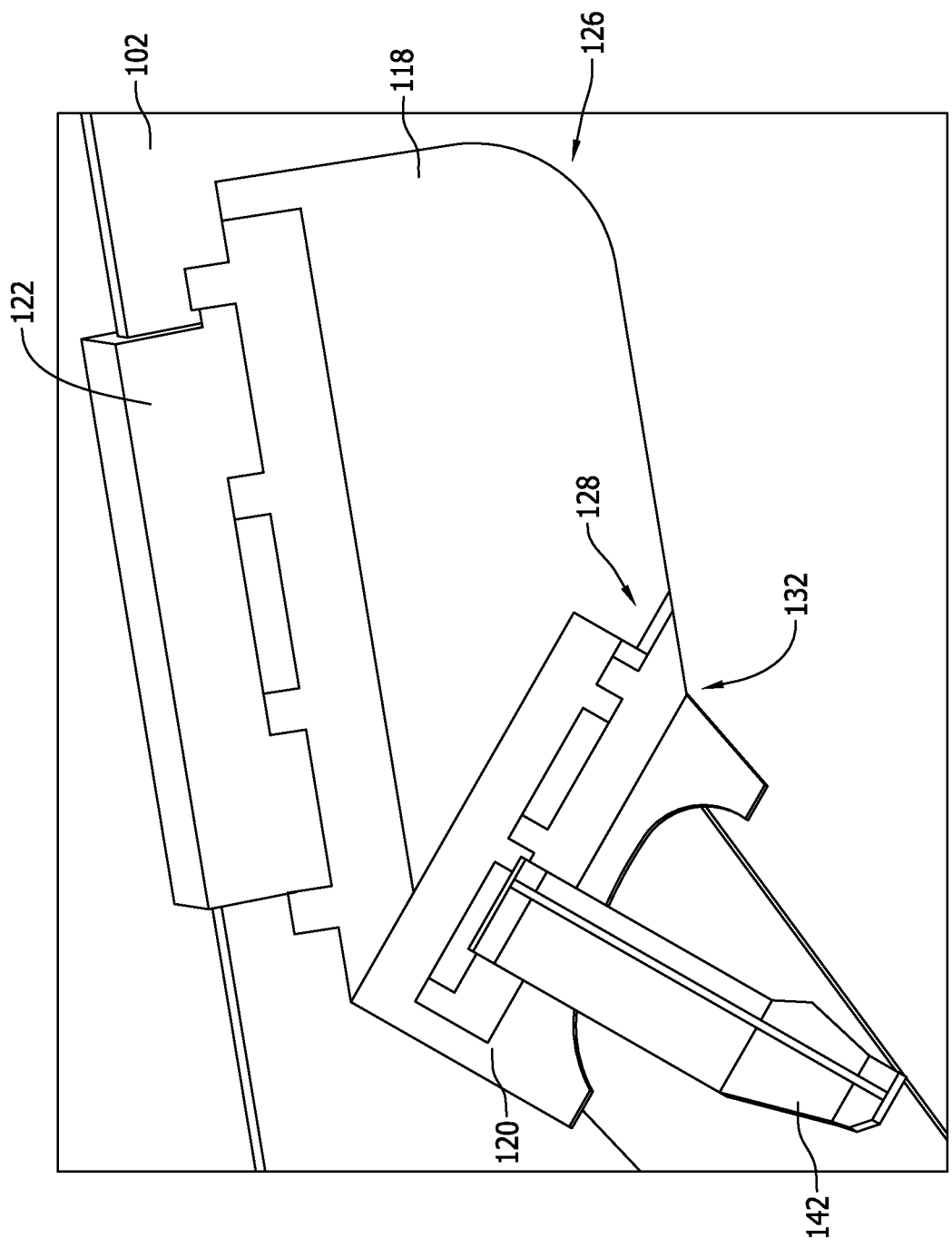
FIG. 8 is a perspective view of the first door of the fairing door assembly in the first door closed position, and the second door in the second door closed position.

FIG. 8 is a perspective view of first door 118 in the first door closed position 126 and second door 120 in the second door closed position 132. In the exemplary implementation, first door 118 is in the first door closed position 126 when second door 120 transitions to the second door closed position 132. Similar to the first door closed position 126, when second door 120 is in the second door closed position 132, second door 120 is oriented substantially parallel to fairing structural panel 102 and covers a portion of slot 106 adjacent first door 118 to reduce airflow through slot 106. More specifically, first door 118 blocks a portion of slot 106 proximate first end 112 of slot 106, and second door 120 blocks a portion of slot 106 aft of the portion blocked by first door 118. Accordingly fairing door assembly 100 facilitates reducing an amount of air flowing through slot 106 compared to known door assemblies, which decreases the drag on aircraft 10 and improves the efficiency of aircraft 10.

The fairing door assembly described herein facilitates covering portions of a slot along which a flap torque tube, which supports the flaps, travels. More specifically, the dual doors of the described fairing door assembly are pivotally coupled to enable the doors to move with respect to one another. More specifically, pivoted connection enables the first door to close, and cover a portion of the slot, before the second door closes. Additionally, the first door closes at a point in time when the flap torque tube is traveling along the slot that is earlier than other known door assemblies. As such, the first door reduces the amount of undesired airflow through the slot through the sequence of flap deployment. Furthermore, the second door closes, and covers a portion of the slot, prior to the flap torque tube reaching its fully deployed position. As such, the second door covers the slot earlier in the deployment sequence than other known door assemblies and, therefore, further reduces the amount of airflow through the slot. As described herein, reducing or preventing airflow through the slot during deployment of the flaps facilitates decreasing the drag and increasing the efficiency of the aircraft.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fairing door assembly for use with an aircraft that includes a flap, said fairing door assembly comprising:
   a first door pivotable between a first door open position and a first door closed position, wherein the first door open position is associated with a first flap position of the flap and the first door closed position is associated with a second flap position; and
   a second door pivotally coupled to said first door, said second door being pivotable between a second door open position and a second door closed position, wherein the second door open position is associated with the first flap position and the second door closed position is associated with a third flap position different than the second flap position.

2. The fairing door assembly of claim 1, wherein when said first door is in the first door closed position, said second door is at least partially open in a second door intermediate position.

3. The fairing door assembly of claim 1, further comprising a hinge configured to couple said first door to a fairing structural panel of the aircraft, wherein said hinge biases said first door toward the first door closed position.

4. The fairing door assembly of claim 1, wherein said second door comprises a transition member fixedly coupled to said second door.

5. The fairing door assembly of claim 4, wherein a force on said transition member causes said second door to pivot with respect to first door.

6. The fairing door assembly of claim 4, wherein a force on said transition member causes said second door to transition between the second door closed position and the second door open position.

7. An aircraft comprising:
a fairing structural panel defining a slot therethrough;
a flap torque tube extending through said slot, said flap torque tube moveable between at least a first flap position, a second flap position, and a third flap position;
a fairing door assembly coupled to said fairing structural panel and said flap torque tube, said fairing door assembly comprising:
a first door pivotally coupled to said fairing structural panel and pivotable between a first door open position and a first door closed position, wherein the first door open position is associated with the first flap position and the first door closed position is associated with the second flap position; and
a second door pivotally coupled to said first door, said second door being pivotable between a second door open position and a second door closed position, wherein the second door open position is associated with the first flap position and the second door closed position is associated with the third flap position.

8. The aircraft in accordance with claim 7, further comprising a contact member coupled to said flap torque tube and configured to contact said first door to transition said first door between the first door open position and the first door closed position.

9. The aircraft in accordance with claim 8, wherein said contact member is configured to transition said second door between the second door open position and the second door closed position.

10. The aircraft in accordance with claim 8, wherein said fairing door assembly comprises a transition member fixedly coupled to said second door, wherein said transition member engages said contact member to transition said second door between the second door open position and the second door closed position.

11. The aircraft in accordance with claim 10, wherein said contact member contacts said first door when said flap torque tube is in the first flap position and contacts said transition member when said flap torque tube is in the second and third flap positions.

12. The aircraft in accordance with claim 7, wherein when said first door is in the first door closed position, said second door is at least partially open in a second door intermediate position.

13. The aircraft in accordance with claim 7, further comprising a hinge configured to couple said first door to said fairing structural panel, wherein said hinge biases said first door toward the first door closed position.

14. The aircraft in accordance with claim 7, wherein said first door is in the first door closed position when said flap torque tube is in the third flap position.

15. A method of operating a flap assembly, said method comprising:
moving a flap torque tube along a slot in a fairing structural panel between at least a first flap position, a second flap position, and a third flap position;
rotating a first door pivotally coupled to the fairing structural panel between a first door open position and a first door closed position, wherein the first door open position is associated with the first flap position and the first door closed position is associated with the second flap position; and
rotating a second door pivotally coupled to said first door between a second door open position and a second door closed position, wherein the second door open position is associated with the first flap position and the second door closed position is associated with the third flap position.

16. The method according to claim 15, wherein rotating the first door comprises biasing the first door toward the first door closed position using a biasing hinge.

17. The method according to claim 15, wherein when the first door is rotating to the first door closed position, the second door is rotating to an at least partially open second door intermediate position.

18. The method according to claim 15, wherein when the flap torque tube is moved to the third flap position, the first door remains in the first door closed position.

19. The method according to claim 15, wherein rotating the second door comprises engaging a transition member coupled to the second door with a contact member coupled to the flap torque tube to cause rotation of the second door between the second door closed position and the second door open position.

20. The method according to claim 19, wherein rotation of the transition member causes the second door to rotate with respect to first door.

* * * * *